United States Patent [19]

Eldridge et al.

[11] Patent Number: 4,459,251

[45] Date of Patent: Jul. 10, 1984

[54] METHOD AND APPARATUS FOR CONTROLLED APPLICATION OF A COATING MATERIAL TO A PIPE JOINT

[75] Inventors: Jess Eldridge, Huntington Beach; Benny L. Shatswell, Orange; Eric Jahoda, Diamond Bar, all of Calif.

[73] Assignee: Joint Systems, Inc., Houston, Tex.

[21] Appl. No.: 372,641

[22] Filed: Apr. 29, 1982

[51] Int. Cl.³ .......................................... B29D 27/04
[52] U.S. Cl. .................................. 264/40.5; 138/112; 138/118.1; 138/155; 138/DIG. 9; 249/90; 249/127; 264/46.7; 264/46.9; 264/259; 264/275; 285/47; 285/254; 425/155; 425/162; 425/817 R
[58] Field of Search ................... 249/87, 88, 89, 90, 249/127; 264/46.9, 46.7, 40.5, 259, 279; 138/96 R, 112, 118.1, 123, 128, 129, 155; 285/254, 235, 45, 47; 53/203, 116; 425/817 R, 155, 162

[56] References Cited

U.S. PATENT DOCUMENTS

| | | | |
|---|---|---|---|
| 943,558 | 12/1909 | Milam | 249/90 |
| 1,237,003 | 8/1917 | Weston | 249/89 |
| 1,846,249 | 2/1932 | Cook et al. | 249/89 X |
| 2,573,366 | 10/1951 | Scholl | 285/45 X |
| 2,763,047 | 9/1956 | Laster | 249/90 |
| 3,141,478 | 7/1964 | Copeland | 249/89 X |
| 3,178,793 | 4/1965 | Rosengarten, Jr. et al. | 249/90 X |
| 3,228,712 | 1/1966 | Hausmann et al. | 285/45 |
| 3,258,512 | 6/1966 | Plower et al. | 249/90 X |
| 3,350,050 | 10/1967 | Buczala et al. | 249/89 |
| 3,731,710 | 5/1973 | Bauer et al. | 138/143 |
| 3,989,281 | 11/1976 | Wilde, Jr. | 285/45 |
| 4,049,480 | 9/1977 | Kutschke | 156/94 |

FOREIGN PATENT DOCUMENTS

| | | | |
|---|---|---|---|
| 048104 | 3/1982 | European Pat. Off. | 53/203 |
| 53-87880 | 8/1978 | Japan | 53/203 |
| 1230624 | 5/1971 | United Kingdom | 53/203 |

Primary Examiner—Philip E. Anderson
Attorney, Agent, or Firm—Pravel, Gambrell, Hewitt, Kirk & Kimball

[57] ABSTRACT

An applicator is provided for coating the uncovered end portions or stubs of pipe sections after they have been welded together. A belt is maintained in tension out of contact with the pipe until the pipe stubs are welded together and coating operations are to begin. The belt is then wrapped onto the pipes forming an annular cavity about the welded stubs. Chain reinforcing mesh is also applied to the exterior of the belt for support. An expanding foam which sets into a hard coating is then injected into the cavity. Once the foam hardens and fills the cavity, the belt and reinforcement are unwrapped from the coated joint and moved away from the pipe.

23 Claims, 7 Drawing Figures

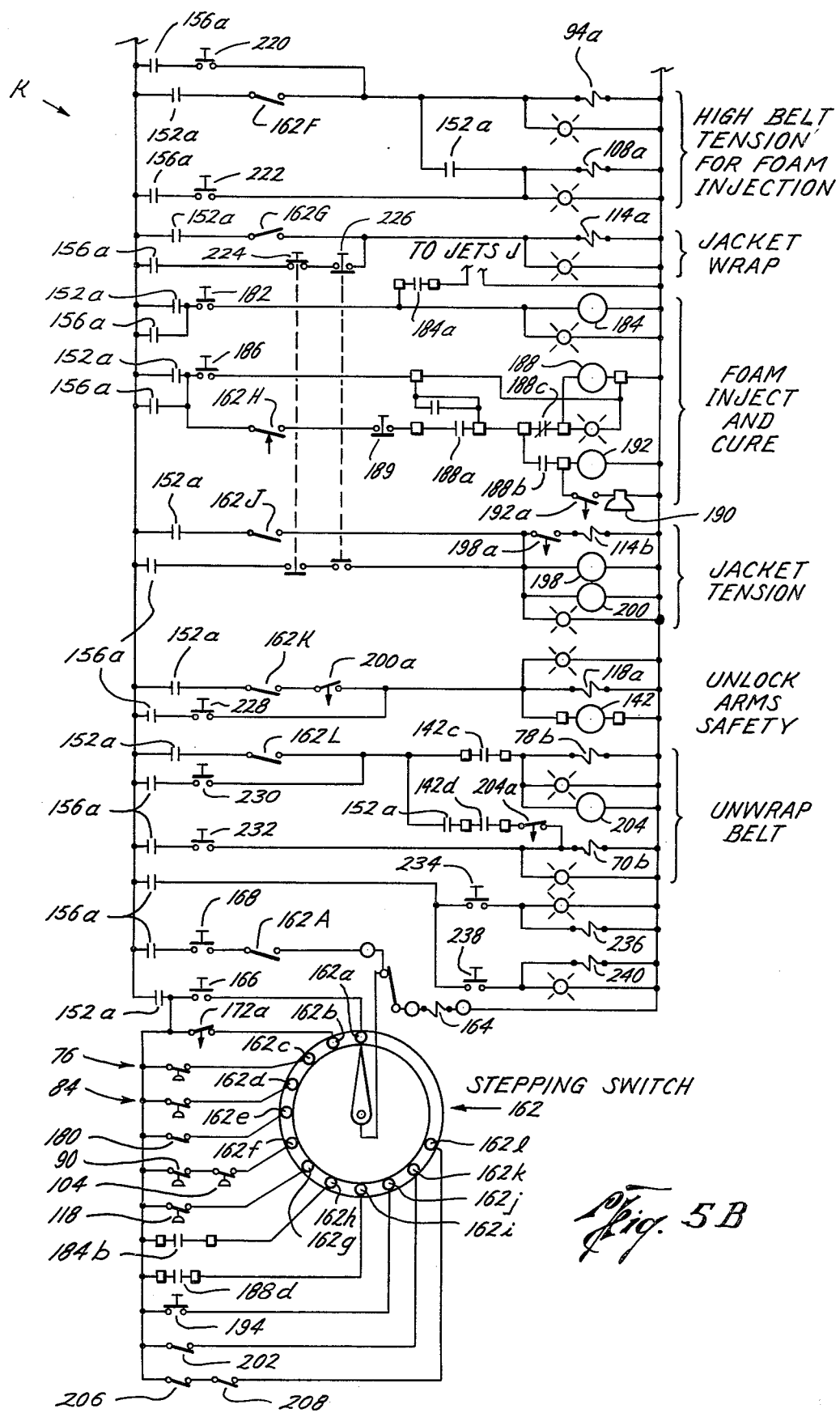

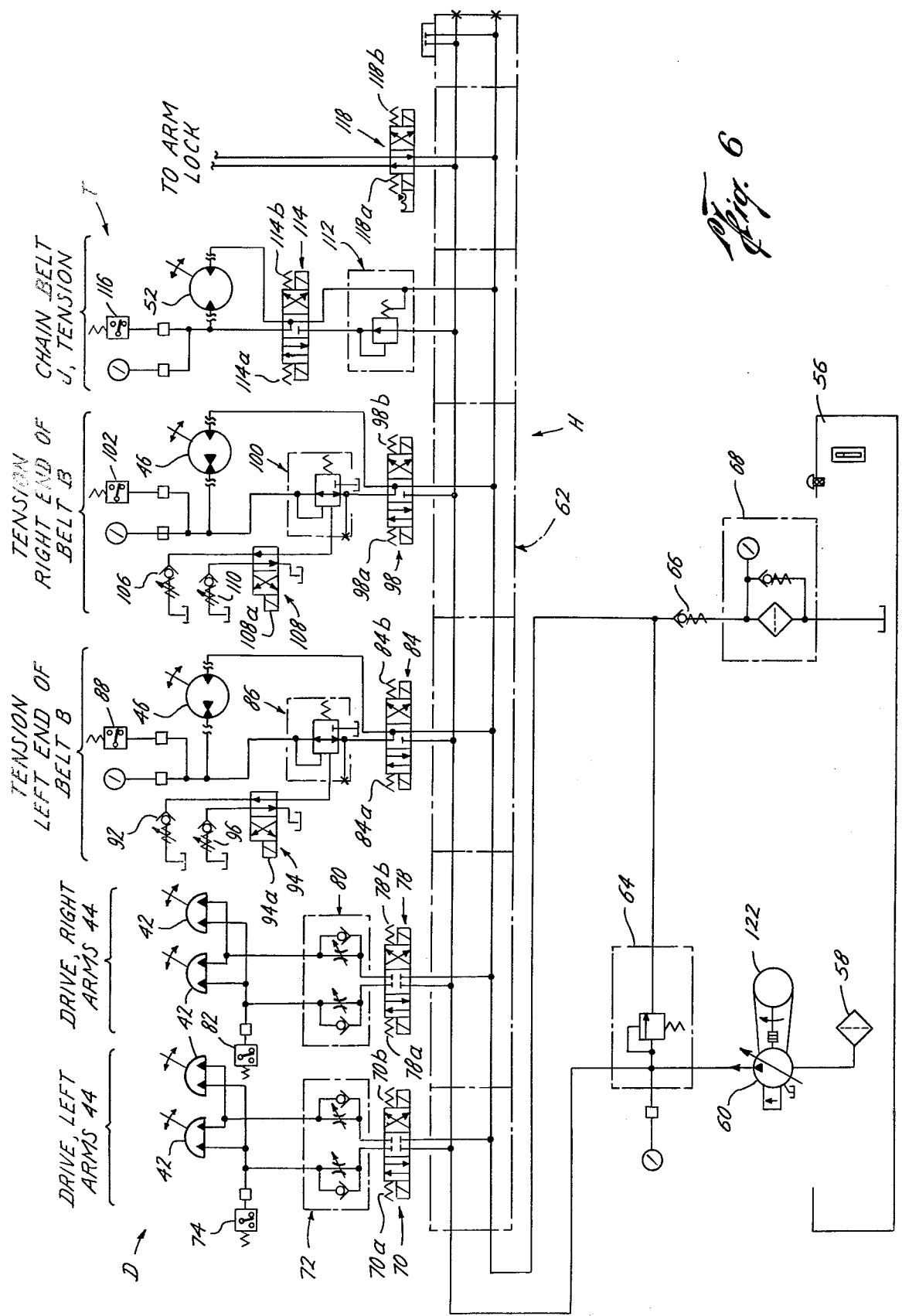

METHOD AND APPARATUS FOR CONTROLLED APPLICATION OF A COATING MATERIAL TO A PIPE JOINT

BACKGROUND OF INVENTION

1. Field of Invention

The present invention relates to the application of coatings to welded joints between sections of pipe, usually as the pipe is being laid.

2. Description of Prior Art

Pipe for petroleum product, particularly for transporting the product through bodies of water, is typically coated with a material, such as several inches of concrete, for protective purposes. However, a portion at each end, or stub, of a section of pipe was left uncoated so that the sections could be welded together as the pipeline was being formed and laid.

Several methods have been proposed to coat the uncovered stubs once the weld had been made and inspected and an anti-corrosive coating applied. A concrete outer coating could be applied, but weight and storage problems were presented, particularly for pipe being laid from vessels in bodies of water. Another approach proposed was to encase the exposed stub portions in a rigid metal mold to form a cavity into which an expanding foam was injected. A final attempt was to form a similar type of annular cavity about the exposed stub portions with an annular sling formed from a suitable synthetic resin and reinforced by a chainlike structure. The pipe sections being connected into the pipeline passed through the annular sling as the stubs were brought into position for application of the foam coating. As a consequence, the sling could be damaged from contact with the pipe. Further, the sling was suspended from two movable clamps or jaw members which included structure to control the tension in the belt and reinforcing jacket. In order for the coated pipe to pass through this apparatus without damaging the sling, the sling had to be kept relatively loosely hung from the jaw members to be kept spaced from the pipe coating. When the loose sling was later tightened to be brought into position for coating, it was difficult to align and uniformly tension. No provision was made to keep the sling aligned in parallel with the pipe. Also, in certain situations, the expanding foam separated the belt ends and left a ridge or irregular surface on the coating. Another problem was that the foam and sling tended to adhere, sometimes requiring four or more people to pull the sling away from the coated pipe once the foam had set. The structure used in this approach was also suspended from a cable by an overhead frame, causing it to be cumbersome and unwieldy, as well as unstable in rough seas, and further occupying needed space on pipe-laying barges.

SUMMARY OF INVENTION

Briefly, the present invention provides a new and improved method and apparatus for applying a coating to exposed end portions of pipe in a pipeline once the end portions have been connected together. A belt formed from a suitable non-adhesive synthetic resin is wrapped about the end portions to form a cavity. The belt is mounted with a pivotally movable frame which maintains the belt in tension in an extended position away from the pipe as the pipe is moved into position for the end portions to be coated. The frame is caused to move pivotally relative to the pipe when the end portions are in position for coating. As the frame moves relative to the pipe, the belt is moved into contact with the pipe and thereafter wrapped onto the pipe, forming the cavity enclosing the uncovered pipe end portions. The coating, typically compositions which react to form a polyurethane foam, is then injected into the cavity. Once the foam coating hardens, the belt is peeled away from the coating by moving the frame so that the belt is moved back into the extended position out of contact with the pipe so that a new set of pipe end portions may be moved into position for coating. The belt is reinforced by a mesh jacket which is also mounted with the movable frame for movement corresponding to that of the belt.

BRIEF DESCRIPTION OF THE DRAWINGS

FIGS. 5A and 5B are schematic electrical circuit diagrams of control circuitry for the apparatus of the present invention; and FIG. 6 is a schematic fluid power diagram of hydraulic controls for the apparatus of the present invention.

DESCRIPTION OF PREFERRED EMBODIMENT

Figure 1:
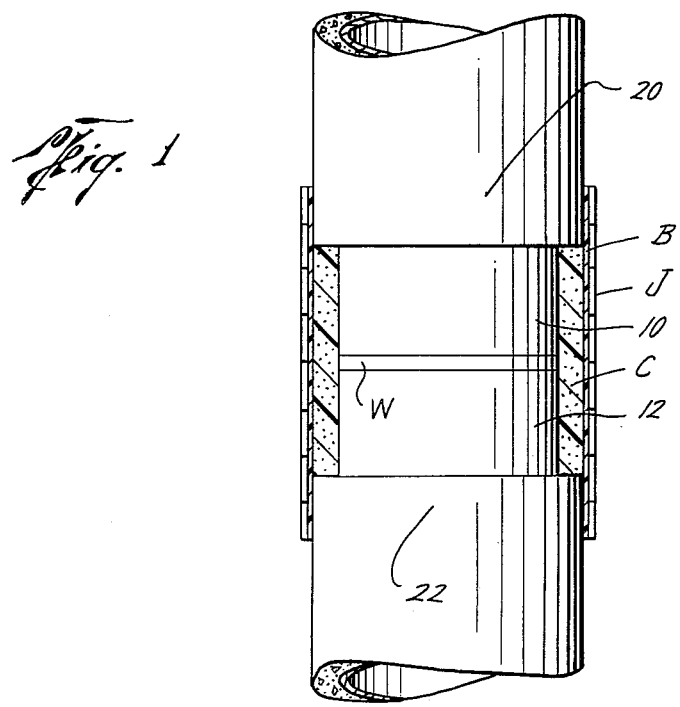
FIG. 1 is a top view, taken partly in cross-section, of pipe being coated according to the present invention.

In the drawings, an apparatus A according to the present invention for applying a coating C to exposed end portions 10 and 12 (FIG. 1) of sections of pipe being formed into a pipeline. As is the typical practice, end portions 10 and 12 are left uncoated and exposed so they may be joined together at a weld W to form the pipeline. If desired, suitable anti-corrosion materials may be placed on end portions 10 and 12 before the coating C is applied.

Figure 2:
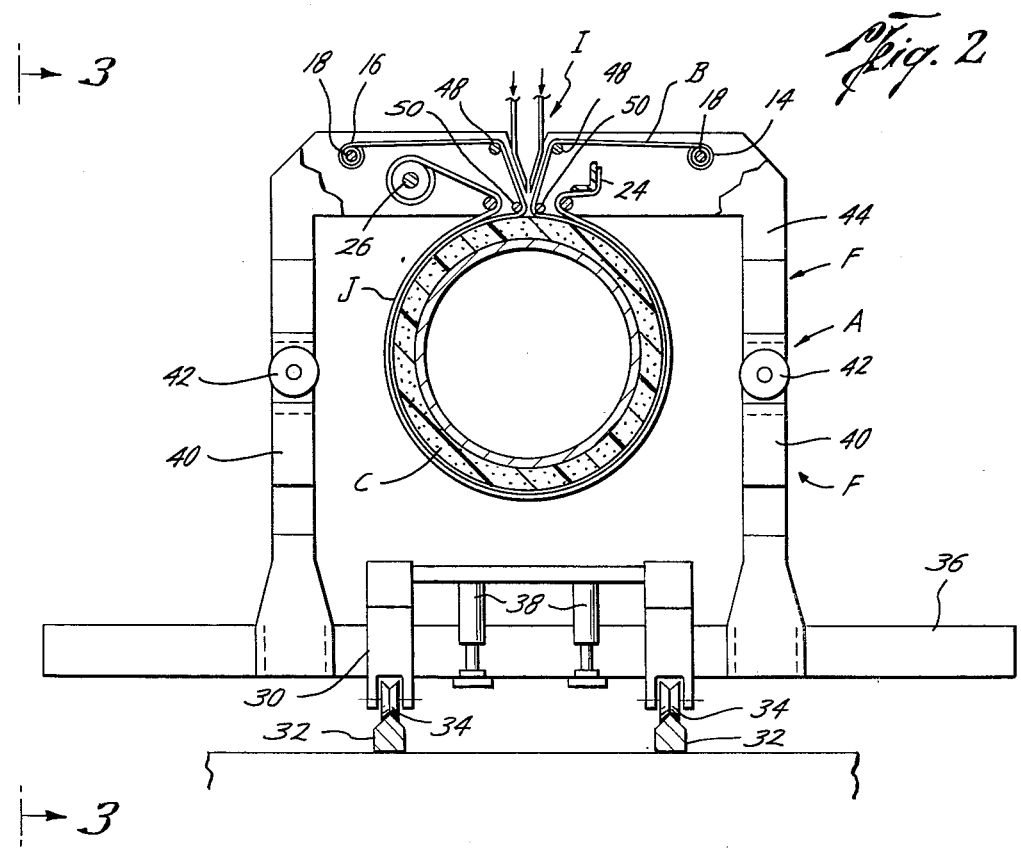
FIG. 2 is a front elevation view of apparatus according to the present invention.

The apparatus A includes a belt B for wrapping about the end portions 10 and 12 to form a generally annular cavity into which conventional chemicals, such as an isocyanate and a suitable synthetic resin, are injected from injector jets I (FIG. 2). When the chemicals contact each other in the annular cavity, they react and expand and set into the hard polyurethane foam coating C for the pipe. Further, the pressures caused by the reaction forming the polyurethane foam cause the foam to penetrate into the relatively permeable concrete for sufficient distance so that a substantially continuous coating with no gaps for water seepage is present along the length of the pipeline. The jets I preferably move into position for injecting the foam and then retract once injection is completed. The number of jets I and their spacing is determined by the length of end portions 10 and 12 to be covered.

Figure 4:
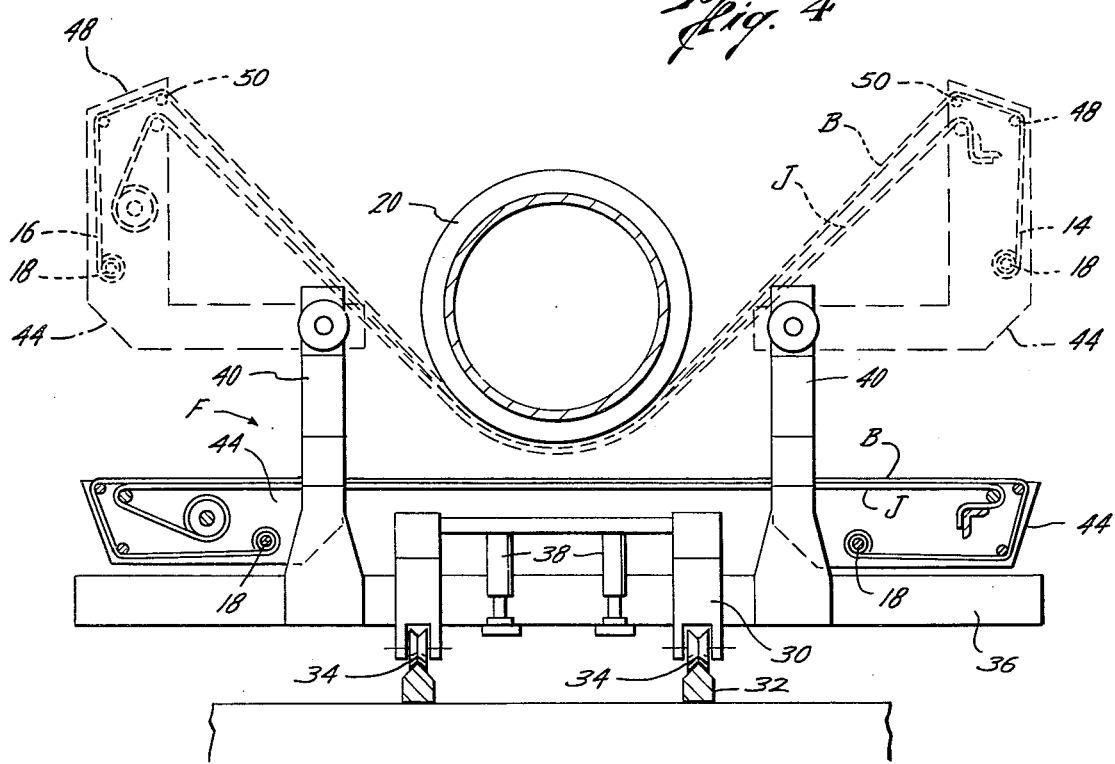
FIG. 4 is a front elevation view of the structure shown in FIG. 2, but with portions thereof moved to different positions.

The belt B is formed from a suitable non-adhesive material, such as a fluorinated hydrocarbon, along at least its inner surface to resist sticking to the coating C. The belt B is rotatably mounted at end portions 14 and 16 with rollers 18 of a tension system T (FIG. 6) on a pivotally movable frame F. The belt B is maintained extended under tension by the apparatus A at a spaced starting or home position from the pipe (FIG. 4) as the pipe is moved into position for the end portions 10 and 12 to be coated. The frame F is caused to move relative to the pipe by a drive system D in the hydraulic system H (FIG. 6). As the frame F moves from the starting or home positions spaced from the pipe, it is moved into contact with coated end portions 20 and 22 (FIG. 1) of the pipe section adjacent the weld W. The belt B is thereafter wrapped onto the pipe, as shown in phantom (FIG. 4). The frame F finally moves to reach a closed position (FIG. 2) in which the injectors I may be inserted into the annular cavity and the foam forming chemicals are thereafter injected.

The belt B is reinforced with a chain belt jacket J formed of a suitable strength and gauge of wire or metal mesh for support purposes. The jacket J is also mounted with the frame F, being fixedly attached at a first end 24 on one side of the frame F and extending to an being rotatably mounted with a tensioner 26 of the tensioner system T. As the jacket J is wrapped onto the belt B for support purposes, tension is also applied thereto by the tensioner system T to strengthen the belt B against pressures present when the polyurethane foam coating C is forming.

Operation of the apparatus A may be controlled either manually or automatically by an operator according to the settings of an electrical control circuit K (FIGS. 5A and 5B) which causes the hydraulic system H to operate in a prescribed sequence controlling the movement of the frame F and the operation of the remaining portions of the apparatus A in a manner to be set forth in detail below.

Turning now in detail to structural features of the apparatus A, when used on pipe laying barges for laying submerged pipelines, the frame F is supported by a carriage 30 mounted for relative movement along the longitudinal axis of the pipeline on a pair of rails 32 by a set of rollers 34. Typically, the rollers 34 are notched to conform to a center crown formed on the rails 32 for riding stability in movement of the apparatus A along portions of the pipeline being laid from the barge. The carriage 30 is connected to a base support member 36 of the frame F by a suitable number of air pistons 38 at each end of the frame F. In this manner, the apparatus A remains relatively parallel with the pipe and stable as the barge rolls or dips during movement through the water due to waves and weather conditions.

The base support member 36 has upwardly extending arms 40 mounted at each end of the frame F on opposite side of the pipe P. The arms 40 may be detachably mounted to the support member 36, such as by bolts and adjustment plates, so that the gap between arms 40 at each end of the frame F may be adjusted to greater or lesser widths depending upon the diameter of the concrete coated pipe.

A hydraulic actuator 42 is mounted at an upper end of each arm 40. The acutator 42 and the arm 40 may, if desired, be connected together by adjustment plates so that the height of the actuators 42 above the support member 36 may be increased or lowered, depending on the size of concrete coated pipe being laid. The actuators 42 are each mounted at a lower end of an inverted L-shaped arm or frame member 44 of the frame F. The arms 44 at opposite ends of the base support member 36 on the same side of the pipe are interconnected and rigidly mounted together by suitable rods or support beams so that they move concurrently and synchronously under power imparted by the actuator 42 during wrapping and unwrapping of the belt B and mesh belt jacket J on the pipe. Again, adjustment plates may be provided between the actuator 42 and the arms 44 to permit compensation for varying sizes of pipe. Power for the operation of the actuators 42 is furnished through the drive system D of hydraulic system H (FIG. 6) under control of the electrical control circuit K (FIGS. 5A and 5B), as will be set forth below.

Figure 3:
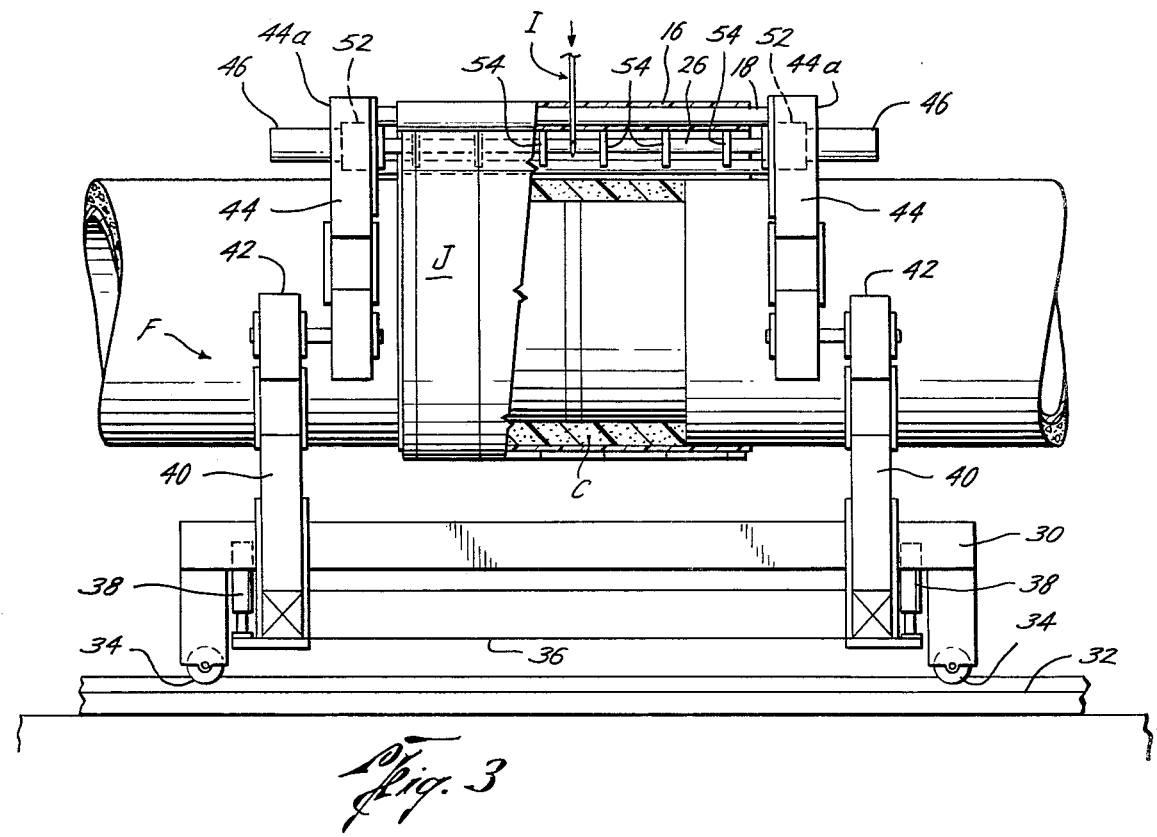
FIG. 3 is a view taken along the line 3—3 of FIG. 2.

The rollers 18 of the tensioning system T extend between arms 44 (FIG. 3) on their respective sides of the pipe. The rollers 18 extend through the arms 44 for connection with hydraulic tensioner motors 46 mounted on outer faces 44a of the arms 44. If desired, only one tensioner motor 46 at one end of frame F on each side of the pipe may be used. The tensioner motors 46 drive, through suitable gearing if necessary, the rollers 18 to cause the belt B to be wrapped or unwrapped onto the pipe, as desired. Power for the operation of the motors 46 is furnished through the tension system T of hydraulic system H (FIG. 6) under control of the control circuit K. The belt B extends inwardly from the rollers 16 and 18 and passes over a suitable number of rotatable guide rollers, such as upper guide rollers 48 (FIGS. 2 and 4) and inner guide rollers 50 extending between the arms 44 along both sides of the pipe.

The mounting plate 24 and the roller 26 for the supporting mesh jacket J extend through arms 44 on their respective sides of the pipe. The roller 26 extends through the arms 44 for connection with hydraulic tensioner motors 52 mounted at each end on outer faces 44a of the arms 44. If desired, only one tensioner motor 52 at one end of frame F need be used. Power for operation of the jacket hydraulic actuators 52 is furnished through the tensioner system T of hydraulic system H, again under control of the control circuit K. The jacket roller 26 is also provided with a number of tensioning sprockets 54 (FIG. 3) at spaced positions along the length of extent between the arms 44 to lend uniformity to the application of tension by the jacket J along the belt B.

Turning now to the hydraulic system H (FIG. 6), a reservoir 56 contains operating fluid which is passed through a strainer 58 into a motor-driven pump 60 which pressurizes the operating fluid and furnishes such fluid through a manifold 62 to operate the apparatus A. A pressure relief valve 64 for returning fluid through a check valve 66 and return line filter 68 to the reservoir 56 is provided in the event that the output pressure of fluid from the pump 60 becomes excessive.

The hydraulic actuators 42 for the set of arms 44 on a first, such as the left, side of the pipe receive operating hydraulic power from the manifold 62 through a solenoid operated valve 70 and a hydraulic control stack 72. A pressure sensing switch 74 is in fluid connection with the valve 70 and control stack 72. When a particular pressure level is reached due to the arms 44 being in the closed position (FIG. 2), the pressure switch 74 closes a contact 76 (FIG. 5B) for operation control purposes.

Similarly, the hydraulic actuators 42 for the roller 18 on the opposite arms 44 receive operating fluid power through a solenoid operated valve 78 and a hydraulic control stack 80. A pressure sensing switch 82 is in fluid connection with the valve 78 and control stack 80 so that when a particular pressure level is reached in the fluid passing through the actuators 42 due to the arms 44 being in the closed position (FIG. 2), a switch 78 (FIG. 5B) in the control circuit K closes for control purposes.

Solenoid operated valve 70 moves from the normal blocked position shown in the drawing (FIG. 6) in response to electrical control signals provided from the control circuit K to cause fluid to flow in one of two reverse directions to the actuators 42 connected thereto. In a first direction, the actuators 42 rotate to move the arm 44 associated therewith from the open position (FIG. 4) to the closed position (FIG. 2). Conversely, when the solenoid valve 70 moves to the opposite position, actuators 42 are caused to move the arm 44 from the closed position to the open position. Pressure switch 74 by sensing the pressure of fluid passing through the valve 70 and actuators 42 detects when the limit closed position is reached and provides an indication of this condition to the control circuit K.

Similarly, solenoid operated valve 78 moves from the normal blocked position shown in the drawing (FIG. 6) in response to electrical control signals provided from the control circuit K to cause fluid to flow in one of two reverse directions to the actuators 42 associated therewith. In a first direction, the actuators 42 rotate to move the arm 44 associated therewith from the open position (FIG. 4) to the closed position (FIG. 2). Conversely, when the solenoid valve 70 moves to the opposite position, actuators 42 move the arm 44 from the closed position to the open position. Pressure switch 74 by sensing the pressure of fluid passing through the valve 70 and actuators 42 detects when the limit closed position is reached and provides an indication of this condition to the control circuit K.

The actuators 46 for the roller 18 along one side of the belt B receive operating fluid power through a solenoid operated valve 84. With the apparatus A in the open position (FIG. 4), the solenoid valve 84 is in the position shown in the drawings, permitting fluid in the actuator 46 to maintain a slight degree of tension on the belt B by roller 18 at the first end 16. Solenoid operated valve 84 moves from this rest or open position to one of two alternate positions depending upon the particular solenoid activated by the control circuit K. When it is desired during manual operation of the apparatus A, or when the apparatus A is operating in the automatic mode, solenoid valve 84 moves rightwardly from the position shown in the drawing, permitting fluid to pass through a reducing/receiving valve 86 so that substantially constant pressure fluid is applied to the actuator 46, causing substantially constant tension to be maintained on a first end of the belt B. Conversely, when in the manual mode of operation of the apparatus A and it becomes desirable to loosen the belt B for some purpose, such as for inspection, solenoid valve 84 moves to the left position from that shown in the drawings, permitting the actuator 46 to cause the belt B to be unwound from its normally maintained position of tension. A pressure switch 88 is in fluid communication with the fluid flowing through the actuator 46 to sense pressure conditions therein. When an established pressure level is reached, a contact 90 (FIG. 5B) in the control circuit K closes.

A remote control valve 92 is in fluid communication with the reducing/receiving valve 86 as the belt B is being wrapped and unwrapped from the pipe. A solenoid operated valve 94 is maintained in the position shown in the drawings to insure such fluid communication. A solenoid 94a of valve 94 is activated by the control circuit K during the time that foam is being injected into the cavity about the pipe, and while such foam is curing, to cause a high pressure setting remote control valve 96 to be brought into fluid communication with the reducing/receiving valve 86, increasing the amount of fluid pressure applied through the actuator 46 to the belt B during the time of injecting and curing the foam in the apparatus A to resist the pressures present when the foam is forming.

The actuators 46 for the roller 16 along the other side of the belt B receive operating fluid power through a solenoid operated valve 98. With the apparatus A in the open position (FIG. 4), the solenoid valve 98 is in the position shown in the drawings, permitting fluid in the actuator 46 to maintain a slight degree of tension on the belt B at the opposite end 18. The valve 98 moves from this rest or open position to one of two alternate positions depending upon the particular solenoid activated by the control circuit K. When it is desired during manual operation of the apparatus A, or when the apparatus A is operating in the automatic mode, solenoid valve 98 moves rightwardly from the position shown in the drawing, permitting fluid to pass through a reducing/receiving valve 100 so that substantially constant pressure fluid is applied to the actuator 46, causing substantially constant tension to be maintained on the end 18 of the belt B. Conversely, when in the manual mode of operation of the apparatus A and it becomes desirable to loosen the belt B for some purpose, such as for inspection, solenoid valve 84 moves to the left position from that shown in the drawings, permitting the actuator 46 to cause the belt B to be unwound from its normally maintained position of tension. A pressure switch 102 is in fluid communication with the fluid flowing through the actuator 46 to sense pressure conditions therein. When an established pressure level is reached, a contact 104 (FIG. 5B) in the control circuit K closes.

A remote control valve 106 is in fluid communication with the reducing/receiving valve 86 as the belt B is being wrapped and unwrapped from the pipe. A solenoid operated valve 108 is maintained in the position shown in the drawings to insure such fluid communication. Solenoid 108a of valve 108 is activated by the control circuit K during the time that foam is being injected into the cavity about the pipe and while such foam is curing to cause a high pressure setting remote control valve 110 to be brought into fluid communication with the reducing/receiving valve 86, increasing the amount of fluid pressure applied through the actuator 46 to the belt B during the time of injecting and curing the foam.

The actuator motor 52 for the roller 26 for the jacket J is provided operating fluid power through a reducing valve stack 112 and a solenoid operated valve 114. The valve 114 is normally in the position shown in the drawings so that the chain belt J is in a relatively slack position (FIG. 4). The solenoid valve 114 moves from the position shown in the drawings to the right in response to an electrical signal from the control circuit K applied thereto, causing the actuator 52 to tighten the chain. A pressure switch 116 is in fluid communication with the fluid passing through the tensioner 52 to sense pressure conditions. When an established pressure level indicative of desired tension in the chain belt J is reached, a switch 118 (FIG. 5) in the control circuit K is closed. Conversely, upon receipt from the control circuit K of a different electrical signal, the valve 114 moves leftwardly from the position shown in the drawings, permitting fluid from the manifold 62 to flow through the activator 52 in a reverse direction, loosening tension in the chain belt J.

Operating fluid power for operation of a conventional solenoid operated lock mechanism, which is suitably located to lock the arms 44 in the closed position, is furnished form the manifold 62 through a solenoid operated valve 118 which under control of the control circuit K causes the lock to move into its locked and unlocked position.

Figure 5A:
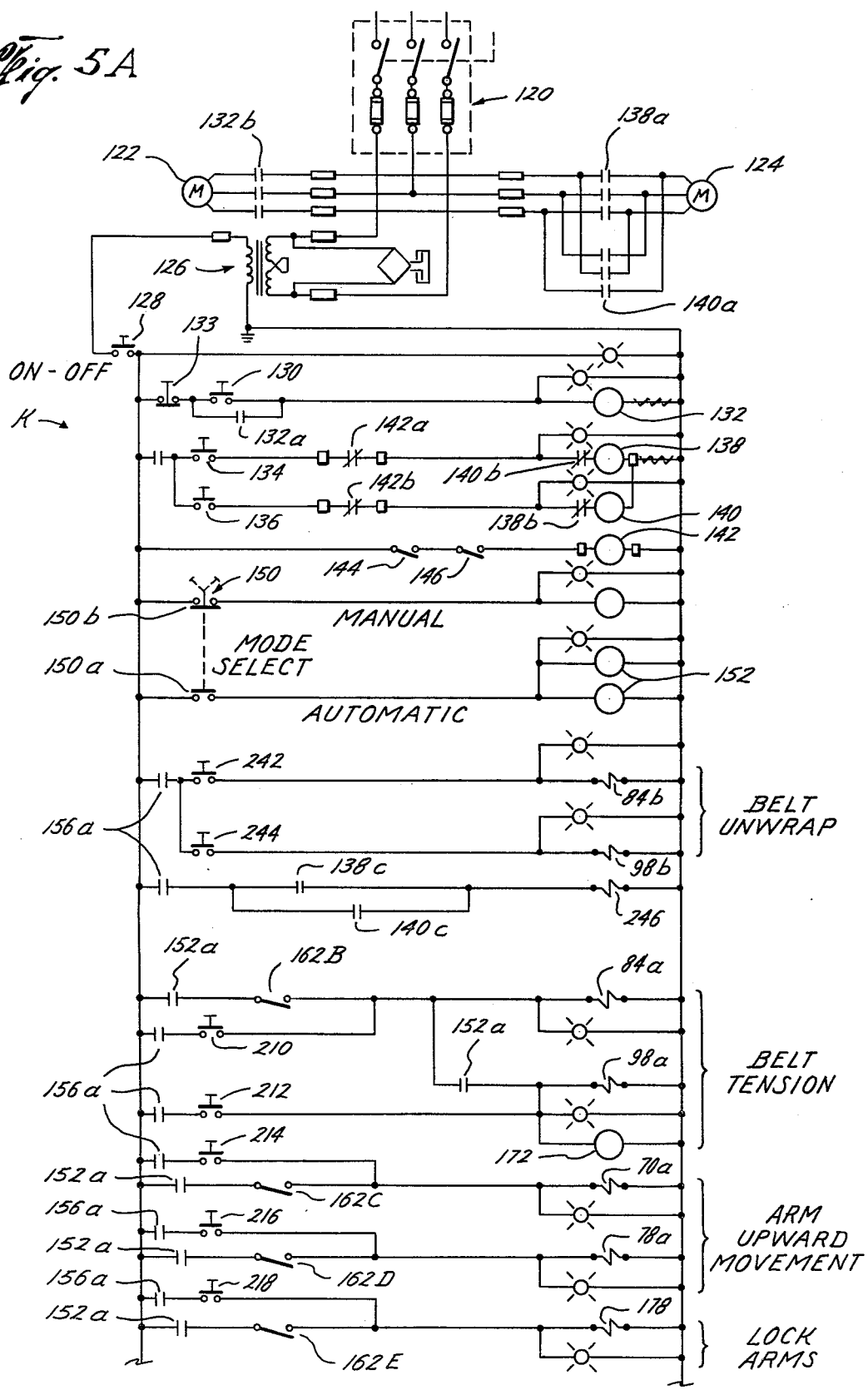

Operating electrical power for the apparatus A is received from three phase power mains through a master disconnect switch 120 (FIG. 5A). The electrical power passes through the switch 120 to drive a motor 122 (FIGS. 5A and 6) which drives the pump 60 of the hydraulic system H. Power is also provided through the switch 120 to a motor 124 which causes the apparatus A to move or traverse along the rails 32. A power transformer 126 also receives incoming power through the switch 120 and reduces the voltage levels to a lower level to furnish operating electrical power to the control circuit K (FIGS. 5A and 5B).

In the control circuit K, a number of relays and timers operate in established sequences to control the operation of the hydraulic system H and apparatus A. Each of these relays and timers has an indicator or lamp connected in parallel therewith to indicate its operating status. Since these lamps are conventional, reference numerals are not provided for them.

The control circuit K receives operating electrical power when a master on-off switch 128 is depressed. Operation of the motor 122 driving the hydraulic pump 60 is controlled by a start switch 130 permitting current to flow through a control relay 132. When current flows through the closed switch 130, and the relay 132 latches itself into operation through a contact 132a and closes another set of contacts 132b permitting electrical current to flow to the motor 122. An off switch 133 is provided to stop operation of motor 122 by interrupting current flow through relay 132.

Control of a traverse motor 124 which drives the carriage 30 along rails 32 is performed by direction selecting switches 134 and 136 which activate relays 138 and 140, respectively. When relay 138 is activated, a set of contacts 138a permit electrical current to flow to the motor 124, causing motion of the apparatus A along the rails 32 in a first direction. A contact 138b opens when the relay 138 is activated, preventing simultaneous activation of relays 138 and 140. Conversely, when the switch 136 is activated, current flows through the relay 140, causing a set of contacts 140a associated therewith to close and cause the motor 124 to move the apparatus A in an opposite direction. A contact 140b associated with the relay 140 opens when relay 140 is activated, preventing operation of the relay 138 when the relay 140 is activated.

A safety relay 142 is electrically connected with a limit switch 144 and a limit switch 146 and does not operate until such switches are closed. Limit switches 144 and 146 are positioned on the frame F so as to close only when both sets of arms 44 have moved to the open position (FIG. 4) so that the belt B is protected from contact with the pipe during movement of the apparatus A along the rails 32. Unless both switches 144 and 146 are closed, relay 142 receives no operating current and contacts 142a and 142b associated therewith remain open, preventing operation of the traverse motor 124 by inadvertent depression of switch 134 or 136.

An operation mode select switch 150 permits an operator of the apparatus A to select two alternative operation modes for the apparatus A under control of the circuit K: a manual, or hand, mode and an automatic mode. In the hand mode, each successive step in the operation of the apparatus A must be initiated by the operator. In the automatic mode, the control circuit K causes the apparatus A to operate in a prescribed substantially automatic sequence to coat the end portions 10 and 12 of the pipe with certain control functions being reserved for the operator. When the automatic mode is selected, a contact 150a of the switch 150 closes, energizing automatic control relays 152. If manual operation of the apparatus A is desired, the switch 150 is moved to close a contact 150b energizing a manual control relay 156.

Both the automatic control relays 152 and the manual control relay 156 inhibit as well as permit certain functions to be performed in the apparatus A by opening or closing certain interlock control contacts associated therewith. These contacts inhibit, for safety and protective reasons, any type of manual operation when the automatic mode is chosen, and any type of automatic operation when the manual mode is chosen. Each of the automatic interlock control contacts operable in response to current through the relay 152 is designated in the drawing with reference numeral 152a. Similarly, each of the manual interlock control contacts operable in response to flow of current through manual control relay 156 is identified with reference numeral 156a.

In operation in the automatic mode, a stepping switch 162 (FIG. 5B) is stepped by the flow of current through a stepping solenoid 164 from a beginning or homing position 162a shown in the drawings counterclockwise to a first operating 162b when current flows through the solenoid 164 once a cycle start button 166 is depressed so that current flows through the closed contact 152a to activate the stepping solenoid 164.

In order to insure that the selector switch 162 is in the proper position 162a to begin the automatic operation mode properly, a manually operable homing switch 168 is provided. The homing switch 168 is operable only when the mode select switch 150 is in the hand mode, and when depressed permits current to flow through solenoid 164 to step switch 162 to homing position 162a. When the homing position 162a is achieved, a contact 162A of switch 162 is opened.

Once the homing position 162a has thus been reached and with the arms 44 fully open (FIG. 4), the mode select switch 150 (FIG. 5A) is moved to the automatic position 150a so that automatic control of the apparatus A is assumed by the control circuit K. The cycle start button 166 (FIG. 5B) is then depressed by the operator and the stepping switch 162 moved from homing position 162a to a second position 162b. In this position, a contact 162B closes and solenoids 84a and 98a (FIG. 6) of the solenoids 84 and 98, respectively, in the hydraulic system H are energized, causing tension to be exerted onto the belt B by the actuators 46. Concurrently therewith, a time delay relay 172 is energized, permitting a sufficient amount of time to elapse for an adequate amount of tension to be exerted on the belt B. When the time set by the time delay relay 172 has elapsed, a contact 172a (FIG. 5B) associated therewith closes, causing the stepping switch 162 to move to a third position 162c. With the switch 162 in the position 162c, a contact 162C (FIG. 5A) of switch 162 closes and current flows to solenoid 70a of the valve 70 (FIG. 6) which is thus energized. Accordingly, the actuators 42 for the first set of arms 44 are activated, moving the arms 44 from the home position (FIG. 4) upwardly to the closed position (FIG. 2), at which point the pressure passing through the actuators 42 activates the pressure switch 74, closing the contact 76 (FIG. 5A), moving the stepping switch 162 to a position 162d. At this time, a contact 162D of switch 162 closes for current to flow to solenoid 78a (FIGS. 5A and 6) for activation of valve 78, permitting fluid under pressure to pass to the actuator motors 42, causing the other set of arms 44 to be raised upwardly from the home position (FIG. 4) to the closed position (FIG. 2).

As the arms 44 are so moving the belt B is initially brought upwardly into contact with the end concrete portions 20 and 22 and thereafter wrapped about the pipe to form the annular cavity for receiving the component chemicals of the foam coating C. During such movement, the length of belt B extending between rollers 18 increases and then decreases depending on the relative spacing of the arms 44. The tensioner system T permits this to occur while maintaining substantially constant tension on the belt B. When the closed position is obtained, the pressure switch 82 (FIG. 6) activates the contact 84, stepping the stepping switch 162 to a position 162e. In the position 162e, a contact 162E closes so current flows to a solenoid 178 to actuate the lock mechanism, locking the sets of arms together in the closed position (FIG. 2). A sensing switch 180 (FIG. 5B) detects when the lock controlled by solenoid 178 has closed and closes, stepping the stepping switch 162 to a position 162f.

In the position 162f, a closed contact 162F (FIG. 5B) allows current flow the solenoid 94a of the valve 94 and the solenoid 108a of the valve 108 are activated, causing the tension applied to belt B to be increased by actuators 46 through the action of valves 86 and 100. Increasing tension on belt B in this manner to a higher level enables the belt B to resist the high pressures caused as the foam coating C is formed. When the proper degree of tension has been exerted on the belt B once wrapped onto the pipe, pressure switches 88 and 102 cause associated contacts 90 and 104, respectively, to close, stepping the stepping switch 162 to a position 162g.

In the position 162g of switch 162, a contact 162g allows energization of a solenoid 114a of the valve 114 to moves the valve 114 to a position permitting fluid under pressure to flow from the manifold 62 to the actuator 52. Actuator 52 then causes the chain belt J to be tightened onto and about the already tensioned belt B. When the pressure switch 116 detects that the requisite pressure and tension have been imposed on the belt J, the contact 118 is closed, causing the stepping switch 162 to move to a position 162h. With the switch 162 in the position 162h, the operator of the apparatus A at this time inspects the relative position of the belt B and the jacket J to insure that they are properly positioned. A contact 162H of switch 162 associated with position 162h remains closed for all positions of switch 162 except the last one so that only one foam injection may be done in a single cycle of switch 162.

If satisfied with the position of the belt B on the joint to be coated, the operator depresses a button 182 which activates a relay 184 which causes the injectors I to be moved into position and inject the components of the foam into the cavity about the joint to be coated. When the relay 184 is activated, a contact 184a associated therewith closes, permitting electrical current to flow to the control mechanisms for the injector jet J and also closing a contact 184b to close moving the stepping switch to a position 162i.

In the position 162i of switch 162, the operator of the apparatus A monitors and inspects the foaming operation as the components are injected into the cavity to form the foam coating C. When foaming operations have been completed, the operator depresses an cure timer switch 186 causing current to flow into a time delay relay 188. The time delay relay 188 has a variable time constant which may be set at a suitable established time interval required for adequate curing of the foam coating C. Further, the time delay relay 188 may manually be reset to the established time interval by a reset switch 189. Once the time delay set in the relay 188 has elapsed, contacts 188a and 188b close, permitting electrical current to flow to an alarm or indicator 190 and a controlling time delay relay 192 associated therewith. The alarm 190 sounds for an interval established by the relay 192 after which a contact 192a controlled by the relay 192 opens, disabling the alarm 190. At the same time that the contact 188a and 188b are closed, a contact 188c is opened, disabling the relay 188. Concurrently therewith, contact 188d is closed, causing the stepping switch 162 to move to a position 162j.

With the switch 162 in position 162j, the operator of the apparatus A at this time inspects the mold formed to determine whether the coating has been satisfactorily applied. If this is the case, the operator depresses a switch 194, causing the stepping switch 162 to move to a position 162k. With the switch 162 in position 162k, a contact 162J is closed so that solenoid 114b of the valve 114 is activated, causing the valve 114 to move to a position permitting reversal of the direction of the fluid flow through the actuator motor 52, releasing the tension applied by the chain belt J.

A time delay relay 198 is electrically connected in parallel with the solenoid 114b to open a contact 198a and limit the duration of time that the chain belt J is unwound for safety reasons. An additional time delay relay 200 is electrically connected in parallel with the solenoid 114b to allow sufficient time for slack to be present in the chain belt J before a contact 200a closes, allowing current through a closed contact 162K of switch 162 to activate a solenoid 118a to unlock the lock holding the arms 44 together.

The safety control relay 142 which controls the operation of the contacts 142a and 142b (FIG. 5A) to inhibit operation of the relays 138 and 140 controlling the traverse motor 124 is electrically connected in parallel with the solenoid 118a to protect against inadvertent operation of the motor 124 when the arms are locked together. Once the arm lock is unlocked, a switch 202 (FIG. 5B) therewith is closed to cause the stepping switch 162 to move to a position 162l. In the position 162l of switch 162 associated contact 162L permits current to flow through a closed contact 142c of the relay 142, activating a solenoid 78b of the valve 78, permitting fluid pressure to cause the actuators 42 to begin opening one set of arms 44. Concurrently therewith, a time delay relay 204 is activated. After a period of time established by the relay 204, a contact 204a associated therewith closes, permitting electrical curent to flow through a contact 142d controlled by the relay 142 and energize a solenoid 70b of the valve 70 and permit the actuators 42 to move the left set of arms 44 to the open position. As the arms 44 move, the tensioned belt B is in effect peeled from the applied coating C. By providing a slight time delay between start of movement of the two sets of arms 44 by actuators 42, the belt B is more easily peeled from the coating C. Limit switches 206 and 208 sense when the sets of arms have reached the fully opened position, at which time they close, causing the stepping switch 162 to move from the position 162l to the homing position 162a.

At this point, with the arms 44 again spaced from the pipe being laid into the pipeline, and a newly welded section may be moved into proximity with the apparatus A, or alternatively, the apparatus A may be moved along the rails 32 to a newly welded pair of pipe sections for application of a new coating C.

In the manual mode of operation, with the closing of the contact 150b and consequent energization of the relay 156 and closing of the interlock contacts 156a associated therewith, operation of the apparatus A proceeds much in the manner of the automatic mode, with the exception that each successive step must be individually activated by the operator of the apparatus A. Thus, a manual switch 210 (FIG. 5A) must be depressed to energize the solenoid 84a to exert tension on the left end of the belt B. Similarly, a manual switch 212 must be depressed to energize the solenoid 98a and exert tension on the right end of the belt B. A manual switch 214 controls movement of the left set of arms 44 through the solenoid 70a of the valve 70, while a switch 216 controls movement of the right set of arms 44 through the solenoid 78a of valve 74. A manual switch 218 is depressed by the operator to energize the solenoid 178 and lock the arms together in place in closing the pipe whose end sections are to be coated. Similarly, to energize the solenoids 94a and 108a of the chain belt tension valves 94 and 108, respectively, manual switches 220 and 222 must be depressed by the operator.

Manual control of the winding and unwinding of the chain belt J onto the belt B is controlled in the manual mode through a wind switch 224 and an unwind switch 226. As in the automatic mode, the start of injection of foam to form the coating C is initiated by the depressing the switch 186, while the reset switch 189 may be manually depressed to reset the operation of timer relay 188 as desired. After the coating C is cured, unwind switch 226 is depressed to release tension in jacket J. A manual switch 228 is provided to energize the solenoid 118a to unlock the arms from each other and opening switches 230 and 232 are provided to cause opening movement of the arms 44 from each other when in the manual operation mode.

In addition to thus permitting operation in the manual mode in a like mode for coating operations to that of the automatic sequence, several additional functions may be performed during operations in the manual mode. For example, a switch 234 (FIG. 5B) may be depressed to energize a solenoid 236 and cause the apparatus A to be raised when in the manual mode, while a switch 238 may be depressed to activate a solenoid 240 causing the apparatus A to be lowered. Also in the manual operation mode, a switch 242 (FIG. 5A) may be depressed to energize solenoid 84b of the valve 84 and a switch 244 depressed to energize a solenoid 98b of the valve 98, causing such valves to move to the alternate position to permit the fluid to flow through the actuators 46 in a reverse direction, causing the belt B to be loosened or paid out from its normal tensile position between the rollers 18. Finally, in the manual mode, an air solenoid 246 (FIG. 5A) is energized through either a contact 138c of relay 138 or contact 140c of relay 140 whenever the motor 124 is in operation causing the apparatus A to be moved along the rails 32. The solenoid 246 when energized activates an engagement clutch which interconnects the mechanical gears driving the apparatus A along the rails 32 with the motor 124 which causes such driving movement.

Although the foregoing description is directed primarily to coating end portions of pipe being laid in a body of water by a barge or other vessel, it will be readily understood by those in the art that the apparatus A may be used where to coat end portions of pipe being laid in land. The apparatus A would in these situations be mounted with or drawn by a vehicle and rollers 34 replaced with wheels or tracks.

The foregoing disclosure and description of the invention are illustrative and explanatory thereof, and various changes in the size, shape and materials, as well as in the details of the illustrated circuitry and construction without departing from the spirit of the invention.

We claim:

1. A method of applying a coating to exposed end portions of pipe adjacent coated pipe portions in a pipeline, comprising the steps of:
   (a) maintaining a belt extended under tension at a spaced position from the pipe as the pipe is moved into position for the end portions to be coated;
   (b) causing relative pivotal movement of the belt with respect to the pipe when the pipe is in position to be coated;
   (c) wrapping the belt about the end portions of the pipe to form a cavity adjacent the exposed portions during such relative pivotal movement;
   (d) injecting chemicals which react to form a hard foam coating into the cavity to cover the end portions of the pipe.

2. The method of claim 1, further including the step of:
   controlling the tension in the belt during relative movement thereof with respect to the pipe.

3. The method of claim 1, further including the steps of:
   (a) maintaining a reinforcing jacket extended at a spaced position from the pipe as the pipe is moved into position for the end portions to be coated;
   (b) causing relative pivotal movement of the reinforcing jacket with respect to the pipe; and
   (c) wrapping the reinforcing jacket about the belt and the end portion to be coated.

4. The method of claim 3, wherein:
   said steps of causing relative pivotal movement of the belt and the reinforcing jacket are performed concurrently.

5. The method of claim 3, wherein:
   said step of wrapping the reinforcing jacket is performed prior to said step of injecting.

6. The method of claim 3, further including the step of:
   maintaining the tension on the belt substantially constant during said steps of causing relative movement and wrapping.

7. The method of claim 6, further including the step of:
   increasing the tension on the belt once the belt is wrapped onto the pipe.

8. An apparatus for applying a coating to exposed end portions of pipe adjacent coated pipe portions in a pipeline, comprising:
   (a) belt means for wrapping about the end portions to form a cavity adjacent the exposed portions;
   (b) pivotally movable frame means for maintaining said belt means extended under tension at a spaced position from the pipe as the pipe is moved into position for the end portions to be coated;

(c) means for causing relative pivotal movement of said frame means with respect to the pipe;

(d) said pivotally movable frame means moving said belt means into contact with the pipe and thereafter wrapping said belt means onto the pipe to form the cavity;

(e) means for injecting the coating into the cavity to cover the end portions of the pipe.

9. The apparatus of claim 1, further including:
tensioner means for controlling the tension in said belt means during relative movement thereof with respect to the pipe.

10. The apparatus of claim 9, wherein said tensioner means comprises:
tensioner means mounted with said movable frame means for controlling the tension in said belt means during relative movement thereof with respect to the pipe.

11. The apparatus of claim 9, wherein said tensioner means comprises:
means for increasing the tension on said belt means after said belt means is wrapped onto the end portions of the pipe.

12. The apparatus of claim 8, wherein said pivotally movable frame means comprises:
plural pivotally movable frame members adapted to be positioned alongside the portions of the pipe to be coated at spaced positions from each other.

13. The apparatus of claim 12, wherein each of said pivotally movable frame members comprises:
at least two relatively movable arms mounted for interconnected movement with each other at spaced positions along a length greater than the exposed end portions to be coated.

14. The apparatus of claim 8, further including:
storage reel means mounted with said movable frame means for containing end portions of said belt means.

15. The apparatus of claim 8, further including:
means for moving said movable frame means along the longitudinal axis of the pipe.

16. The apparatus of claim 8, further including:
means for moving said movable frame means with respect to the longitudinal axis of the pipe.

17. The apparatus of claim 8, further including:
means for reinforcing said belt means.

18. The apparatus of claim 17, wherein:
said pivotally movable frame means includes means moving said jacket means into contact with said belt means when said belt means is wrapped onto the pipe.

19. The apparatus of claim 17, further including:
means for applying tension to said jacket means.

20. The apparatus of claim 17, wherein:
(a) said pivotally movable frame means includes means maintaining said means for reinforcing extended at a spaced position from the pipe as the pipe is moved into position for the end portions to be coated;
(b) said means for causing relative pivotal movement includes means for causing relative pivotal movement of said means for reinforcing with respect to the pipe.

21. The apparatus of claim 1 further including:
means for wrapping said means for reinforcing onto said belt means and the end portions to be coated.

22. The apparatus of claim 20, further including:
sprocket means for distributing the tension applied thereto substantially constant along the length thereof.

23. The apparatus of claim 8, wherein the pipeline is being laid from a vessel in a body of water, and further including:
means for cushioning said frame means from movement as the vessel moves due to wave action of the water and the like.

* * * * *